United States Patent [19]

Niederdellmann et al.

[11] 4,160,686

[45] Jul. 10, 1979

[54] METHOD OF REVERSE COATING TEXTILE SHEETS WITH POLYURETHENE

[75] Inventors: Georg Niederdellmann, Dormagen; Bernd Quiring; Wilhelm Thoma, both of Leverkusen, all of Fed. Rep. of Germany

[73] Assignee: Bayer Aktiengesellschaft, Leverkusen, Fed. Rep. of Germany

[21] Appl. No.: 838,683

[22] Filed: Oct. 3, 1977

[30] Foreign Application Priority Data

Oct. 5, 1976 [DE] Fed. Rep. of Germany ....... 2644923

[51] Int. Cl.² .................................................. C09J 5/00
[52] U.S. Cl. ..................................... 156/331; 156/239; 156/315; 156/249; 260/32.6 NR; 427/381; 427/412; 427/390 R; 428/424; 428/425; 528/65
[58] Field of Search .......................... 156/239–315, 156/249–331; 427/381–412, 390 R; 428/424–425; 260/32.6 NR, 75 NA, 75 NQ, 77.5 A, 77.5 AM

[56] References Cited

U.S. PATENT DOCUMENTS

| | | | |
|---|---|---|---|
| 2,621,166 | 12/1952 | Schmidt et al. | 528/47 |
| 2,929,800 | 3/1960 | Hill | 260/32.6 NR |
| 3,315,380 | 4/1967 | Mack et al. | 156/310 |
| 3,321,433 | 5/1967 | Baumann | 260/32.6 NR |
| 3,411,981 | 11/1968 | Thomas | 156/331 |
| 3,503,927 | 3/1970 | Chang et al. | 260/77.5 AM |
| 3,886,226 | 5/1975 | Asai et al. | 528/28 |
| 3,891,785 | 6/1975 | Zimlin | 427/390 R |

*Primary Examiner*—John T. Goolkasian
*Assistant Examiner*—J. J. Gallagher
*Attorney, Agent, or Firm*—Gene Harsh; Lawrence S. Pope

[57] ABSTRACT

The present disclosure is concerned with an improved method of reverse coating textile sheets with storage stable polyurethane top and adhesive coats which are formulated to have improved resistance to deformation under heat and pressure. At least one of the coats is formulated from a diisocyanate, a high molecular weight dihydroxy compound and a mixture of at least one low molecular weight diol with a low molecular weight monoalkanolamine. The coatings are applied in the usual reverse coating manner, i.e. the top coat is applied to a release substrate from solution; dried; the adhesive coat is applied from solution onto the dried top coat; and the textile substrate is laminated to the adhesive coat.

11 Claims, No Drawings

METHOD OF REVERSE COATING TEXTILE SHEETS WITH POLYURETHENE

FIELD OF THE INVENTION

This invention relates to the use of special one-component polyurethanes for coating textile sheets by the reversal process. In the process according to the invention, segmented, substantially linear polyurethanes obtained from dihydroxy polyesters and/or dihydroxy polyethers, aromatic and/or aliphatic diisocyanates and a mixture of at least one glycol and at least one monoalkanolamine as chain lengthening agent are applied from solution to form a bonding coat and/or top coat. These polyurethanes not only have exceptionally advantageous properties as solutions but also give rise to coatings which have a high resistance to distortion under heat and pressure and can therefore be ironed at high temperatures.

BACKGROUND OF THE INVENTION

It is already known in the art to coat textiles such as woven or knitted fabrics and non-woven bonded webs with solutions of polyurethanes by the direct or the reversal process. The articles obtained are used for the manufacture of outer-wear garments, upholstery goods, luggage, shoe uppers, tents and tarpaulins, blinds and many other products.

In contrast to the two-component polyurethanes, which have been known for some time, the so-called one-component polyurethanes have been more recently introduced into the art. These products are obtained by the reaction of polyhydroxyl compounds, in practice mainly dihydroxy polyesters or dihydroxy polyethers, in combination with glycols, preferably butane diol-(1,4), and aromatic diisocyanates, preferably 4,4'-diphenylmethane diisocyanate as described in German Patent Specification No. 1,106,959 and German Auslegeschrift No. 1,112,291. Solutions of one component polyurethanes have a practically unlimited pot life. Formation of films from these polyurethanes is a purely physical process which, in contrast to the formation of films from two-component polyurethanes, is not accompanied by any chemical cross-linking reaction.

In contrast to chemical cross-linking, physical cross-linking is reversible, which means that one-component polyurethanes are thermoplastically deformable. This inevitably renders textile coats containing one-component polyurethanes to some extent sensitive to deformation by pressure at elevated temperatures. One consequence of this is that, in certain fields of application, for example in the manufacture of shoe uppers, these materials are insufficiently able to withstand ironing because the coating undergoes thermal deformation by pressure even below its melting range and irreversibly penetrates the fabric ("penetration by ironing" of the fabric structure).

An improvement in the resistance to ironing can generally be obtained by elevating the temperature range at which the polyurethane melts. The usual methods employed for elevating the polyurethane melting range are based, for example, on increasing the proportion of hard segments by using a higher molar proportion of chain-lengthening agents, by incorporating short, compact hard segments by using short chain glycols, preferably ethylene glcyol, as chain-lengthening agent, or by incorporating high melting aromatic hard segments, for example by using 1,4-phenylene-bis-(β-hydroxyethyl ether) as chain-lengthening agent. Unfortunately, this known method of elevating the polyurethane melting range invariably reduces the solubility of the polyurethanes in the usual commercial solvent combinations so that the resulting solutions are more or less viscous and in many cases even tend to be pasty and are difficult or even impossible to process in the usual coating installations.

It is known from German Auslegeschrift No. 2,161,340 and German Offenlegungsschrift No. 2,402,799 which corresponds to U.S. Ser. No. 542,734, filed Jan. 20, 1975 to Thoma et al. that the solubility of one-component polyurethanes can be improved by using an equimolar mixture of at least two different glycols instead of a single glycol as chain-lengthening agent. Unfortunately, however, the use of such mixtures of chain-lengthening agents significantly lowers the polyurethane melting range so that the dimensional stability at elevated temperatures and hence the resistance to ironing of the polyurethane coatings are again reduced.

SUMMARY OF THE INVENTION

It has now surprisingly been found that one-component polyurethanes which are readily soluble in the usual solvents to form solutions which are stable in storage and which have excellent resistance to distortion under pressure at elevated temperatures can be obtained by using a mixture of at least one glycol or a low molecular weight diol and at least one monoalkanolamine as chain-lengthening agent.

The present invention relates to a method of coating textile sheets by the reversal process with polyurethanes which have improved resistance to thermal pressure distortion and form solutions which are stable in storage, according to which the solution of a polyurethane which is substantially free from reactive end groups is applied as top coat to a separating substrate in a first stage of the process, the top coat is dried, an adhesive solution is applied to the top coat in a second stage of the process, the textile sheet is laminated thereto, the solvent in the adhesive coat is evaporated off in a second drying operation and the coated textile is then stripped from the separating substrate, characterized in that the substances used as top coat and/or adhesive coat are polyurethanes which have been obtained by the reaction of (a) at least one dihydroxyl compound having a molecular weight of between about 500 and 5000, (b) at least one diisocyanate, and (c) a mixture of about 95–35 mol % of at least one diol having a molecular weight of about 62 to 450 and about 5–65 mol % of at least one monoalkanolamine having a molecular weight of from about 61 to approximately 200, the molar ratio of compounds (a) and (c) being between about 1:1 and 1:6.

The polyurethanes may be prepared solvent-free or in solution by known methods, either by the one shot process or by way of a prepolymer.

DETAILED DESCRIPTION OF THE INVENTION

Particularly suitable dihydroxyl compounds with a molecular weight of from about 500 to 5000, preferably about 800 to 2500 are dihydroxy polyesters and/or dihydroxy polyethers.

The dihydroxy polyesters are obtained in known manner from one or more dicarboxylic acids preferably having at least six carbon atoms and one more dihydric alcohols.

Instead of free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. by halogen atoms, and/or unsaturated. The following are examples: succinic acid; pimelic acid; adipic acid; suberic acid; azeleic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride, fumaric acid; dimeric and trimeric fatty acids such as maleic acid which may be mixed with monomeric fatty acids; dimethyl terephthalate and terephthalic acid-bis-glycol esters. Aliphatic dicarboxylic acids are preferred and adipic acid is particularly preferred. Suitable dihydric alcohols include e.g. ethylene glycol; propylene glycol-(1,2) and -(1,3); butylene glycol-(1,4) and -(2,3); hexane diol-(1,6); octane diol-(1,8); neopentylglycol; 1,4-bis-hydroxymethylcyclohexane; 2-methyl-1,3-propane diol; diethylene glycol; triethylene glycol; tetraethylene glycol; polyethylene glycols; dipropylene glycol; polypropylene glycols; dibutylene glycol and polybutylene glycols. Polyesters of lactones such as ε-caprolactone or of hydroxy carboxylic acids such as ε-hydroxycaproic acid may also be used.

Apart from these polyesters, hydroxy polycarbonates are also suitable for preparing the polyurethanes used according to the invention, particularly the hydroxy polycarbonates obtained from hexane diol-(1,6) and diarylcarbonates and the esterification products of straight chain hydroxy alkane monocarboxylic acids having at least 5 carbon atoms or the corresponding lactone polymers or polymer diols such as polybutadiene diol.

Polyethers with two hydroxyl groups which may be used according to the invention are also known per se and may be prepared, for example by the polymerization of epoxides such as ethylene oxide, propylene oxide, butylene oxide, tetrahydrofuran, styrene oxide or epichlorohydrin, either each on its own, for example in the presence of boron trifluoride or by chemical addition of these epoxides, either as mixtures or successively, to starting components which contain reactive hydrogen atoms, such as alcohols or amines, e.g. water, ethylene glycol, propylene glycol-(1,2) or -(1,3), 4,4'-dihydroxydiphenyl propane, aniline, ethanolamine or ethylene diamine.

Dihydroxybutylene glycol polyethers and dihydroxy propylene glycol polyethers are particularly preferred.

Starting components to be used according to the invention also include aliphatic, cycloaliphatic, araliphatic, aromatic and heterocyclic polyisocyanates such as those described, for example, by W. Siefken in Justus Liebigs Annalen der Chemie, 562, pages 75–136, for example ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3- and 1,4-diisocyanate and any mixtures of these isomers; 1-methyl-2,6-diisocyanato cyclohexane; 1-methyl-2,4-diisocyanato cyclohexane; 1-isocyanato-3,3,5-trimethyl-5-isocyanatomethyl-cyclohexane per hydro-2,4'- and/or -4,4'-diphenylmethane-diisocyanate; phenylene-1,3- and -1,4- diisocyanate and any mixtures of these isomers; tolylene-2,4- and -2,6-diisocyanate and any mixtures of these isomers, diphenylmethane-2,4'- and/or 4,4'-diisocyanate; naphthylene-1,5-diisocyanate; 4,4'-diphenyl-dimethyl methane diisocyanate and any mixtures of these compounds. 4,4'-diphenylmethane diisocyanate is particularly suitable.

The low molecular weight diol components with a molecular weight of from about 62 to 450 are used as chain-lengthening agent components for the preparation of the polyurethanes used according to the invention. Various types of diol components may be used according to the invention, for example (a) alkane diols such as ethylene glycol; propylene glycol-(1,3) and -(1,2); butane diol-(1,4); pentane diol-(1,5); dimethylpropane diol-(1,3) and hexanediol-(1,6);

(b) ether diols such as diethyleneglycol; triethylene glycol or 1,4-phenylene-bis-(β-hydroxyethyl ether);

(c) amino diols such as N-methyl-diethanolamine or N-methyl-dipropanolamine;

(d) ester diols of the general formulae

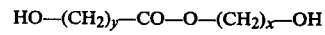

and

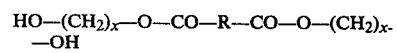

in which
R represents an alkylene or arylene group having from 1 to 10, preferably 2 to 6 carbon atoms,
x=2–6 and
y=3–5
e.g. δ-hydroxybutyl-ε-hydroxy-caproic acid ester, ω-hydroxyhexyl-γ-hydroxybutyric acid ester; adipic acid-bis-(β-hydroxyethyl) ester and terephthalic acid-bis(β-hydroxyethyl) ester;

(e) diol urethanes of the general formula

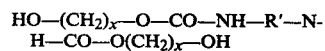

in which
R' represents an alkylene, cycloalkylene or arylene group having from 2 to 15, preferably 2 to 6 carbon atoms and
x represent an integer between 2 and 6,
e.g. 1,6-hexamethylene-bis-(β-hydroxyethyl urethane) or 4,4'-diphenylmethane-bis-(δ-hydroxybutyl urethane).

The monoalkanolamines used as chain lengthening agent components for the preparation of the polyurethanes used according to the invention have molecular weights of from about 61 to about 200 and they contain both a primary amino group and an aliphatic hydroxyl group. Typical examples of this class of compounds include 2-amino ethanol; N-methyl-N-(2-hydroxyethyl)-ethylene diamine; N-methyl-N-(2-hydroxyethyl)-trimethylene diamine; 1-amino-3-propanol; 1-amino-2-propanol; 4-amino-2-butanol; 4-amino-1-butanol; 2-amino-2-methylpropanol; 2-(p-aminophenyl)-ethanol; p-aminophenyl-methylcarbinol and 2-(p-aminocyclohexyl)ethanol.

The chain-lengthening agents used according to the invention consist of a mixture of from about 95 to 35 mol %, preferably 90 to 50 mol %, of at least one diol of the kind mentioned above and about 5 to 65 mol %, preferably 10 to 50 mol %, of at least one monoalkanolamine of the kind mentioned above.

Chain-lengthening agent mixtures of ethylene glycol and/or butane diol with monoethanolamine and/or 1-amino-3-propanol are preferred. Chain-lengthening agent mixtures containing, for example, about 5 to 35 mol % of monoethanol-amine and about 95 to 65 mol % of ethylene glycol are particularly preferred.

The molar ratio of higher molecular weight polyesters or polyethers on the one hand to the mixture of low molecular weight chain-lengthening agents on the other should be between about 1:1 and 1:6, preferably between about 1:1.5 and 1:5. The polyurethanes are substantially free from reactive end groups. They are generally prepared at an NCO/OH ratio of between about 0.95 and 1.05, preferably between about 0.96 and 1.01.

The solvents used for the polyurethanes according to the invention may be either highly polar or less polar solvents known per se, or mixtures of such solvents. Examples include dimethylformamide; dimethylacetamide; dimethylsulphoxide, ethylacetate; methylglycol acetate; methylethyl ketone; acetone; cyclohexanone, tetrahydrofuran; dioxane; halogenated hydrocarbons such as chlorobenzene or dichloroethylene and aromatic hydrocarbons such as toluene or xylene.

When the polyurethanes are used as adhesive coats according to the invention, highly polar solvents such as dimethylformamide are preferably present in quantities of not more than about 65% by weight and most preferably not more than about 50% by weight, based on the total quantity of solvent mixtures.

If desired, the top coats according to the invention may be applied to the textile substrates together with two-component polyurethane systems known per se. These generally consist of solutions of a mixture of polyurethane prepolymers which contain hydroxyl end groups and have a molecular weight of about 10,000 to 80,000, preferably 20,000 to 50,000, polyisocyanates and catalysts. Apart from the polyisocyanates already mentioned above, compounds containing more than two isocyanate groups or reaction products of polyhydroxyl compounds with excess polyisocyanates may also be used, for example a 75% solution in ethyl acetate of a polyisocyanate from trimethylol propane and 2,4-tolylene diisocyanate having an isocyanate content in the form of free tolylene diisocyanate of less than 0.3%.

The solutions used for the adhesive coats often contain catalysts known per se, e.g. tertiary amines such as triethylamine; tributylamine; N-methyl-morpholine; N-ethylmorpholine; N,N,N',N'-tetramethyl-ethylene diamine; 1,4-diaza-bicyclo-(2,2,2)-octane; N-methyl-N'-dimethyl-aminoethyl-piperazine; N,N-dimethylbenzylamine; bis-(N,N-diethylaminoethyl)-adipate; N,N-diethylbenzylamine; pentamethyldiethylene triamine; N,N-dimethylcyclohexylamine; N,N,N',N'-tetramethyl-1,3-butane diamine; N,N-dimethyl-$\beta$-phenylethylamine; 1,2-dimethylimidazole or 2-methylimidazole.

The following are examples of tertiary amines containing hydrogen atoms which are reactive with isocyanate groups; triethanolamine; triisopropanolamine; N-methyldiethanolamine; N-ethyl-diethanolamine and N,N-dimethyl-ethanolamine and their reaction products with alkylene oxides such as propylene oxide and/or ethylene oxide.

Silaamines with carbon-silicon bonds such as the compounds described in German Patent Specification No. 1,229,290 may also be used as catalysts, e.g. 2,2,4-trimethyl-2-silamorpholine and 1,3-diethylaminomethyl-tetramethyldisiloxane. Organic metal compounds may also be used as catalysts according to the invention, in particular organic titanium compounds.

Other examples of catalysts which may be used according to the invention and details concerning their activity may be found in Kunststoff-Handbuch, Vol. VII, published by Vieweg and Höchtlen, Carl-Hanser-Verlag, Munich 1966, e.g. on pages 96–102 and *Polyurethanes: Chemistry and Technology*, Vol. I Chemistry, Saunders and Frisch, Interscience, 1964.

The adhesive coat and top coat solutions which contain the polyurethanes used according to the invention may also contain the usual pigments, fillers, polymer resins and other auxiliary agents such as stabilizers against hydrolysis, UV stabilizers, anti-oxidants, polysiloxanes, cross-linking agents and accelerators.

EXAMPLES OF APPLICATION

The thermal pressure resistance (resistance to ironing) of the polyurethanes was tested by means of a Hoekstra-Plastometer manufactured by Nederlandsche Optieken Instrumentenfabriek Dr. C. E. Bleeker N. V., Zeist Holland. A test foil about 1 mm in thickness was preheated for 30 seconds between two presses heated to the test temperature and the foils were then subjected to a pressure of 10 kp/cm$^2$ for 2 minutes. The percentage residual thickness of foils could be read off an instrument scale. After removal of the pressure from the samples, the remaining percentage residual thickness of the foils was taken as a measure of the thermal pressure distortion.

EXAMPLE 1a

Adhesive coat solution H 1 is a 35% solution of a polyester urethane in dimethylformamide (DMF)/methylethyl ketone (MEK) (1:1) having a viscosity of 55,000 cP/25° C. The polyester urethane elastomer is synthesized from 2195 parts by weight (1.0 mol) of a polyester of butane-1,4-diol and adipic acid having a hydroxyl number of 50.6 and an acid number of 0.5; 186.21 parts by weight (3.0 mol) of ethylene glycol and the equivalent quantity (1000 parts by weight) of 4,4'-diphenylmethane diisocyanate. A polyurethane film prepared from the fresh solution was found to have the following physical properties:

| | |
|---|---|
| Tensile strength | 48.8 MPa |
| Elongation at break | 500% |
| 100% modulus | 5.2 MPa |
| Micro hardness | 80 |
| Melting range | 180°–190° C. (Kofler bench) |
| Pressure deformation after 2'/160° C. | 4% |
| Permanent pressure deformation | 0% |

After a storage time of 48 hours, the polyurethane solution (H 1) had been completely converted into a paste and could no longer be processed.

EXAMPLE 1b

Adhesive coat solution H 2 is a 35% solution of a polyester urethane in DMF/MEK (1:1) having a viscosity of 41,000 cP/25° C. The polyester urethane was in this case synthesized from 2,195 parts by weight (1.0 mol) of the same polyester as in adhesive coat solution H 1, 155.18 parts by weight (2.5 mol) of ethylene glycol, 45.06 parts by weight (0.5 mol) of butane diol and the equivalent quantity (1000 parts by weight) of 4,4'-diphenylmethane diisocyanate. A polyurethane film formed from this solution had the following physical properties:

| | |
|---|---|
| Tensile strength | 62.5 MPa |
| Elongation at break | 620% |
| 100% modulus | 3.9 MPa |
| Micro hardness | 83 |
| Melting range | 165°–180° C. (!) (Kofler bench) |
| Pressure deformation after 2'/160° C. | 65% (!) |
| Permanent pressure deformation | 45% (!) |

Polyurethane solution (H 2) shows no tendency to become pasty and is still in good condition for processing after several weeks of storage. However, the resistance of the polyurethane to ironing (high permanent pressure deformation) is unsatisfactory; moreover, the polyurethane has a substantially lower melting range.

EXAMPLE 1c

Adhesive coat solution H 3 is a 35% solution of a polyester urethane in DMF/MEK (1:1) having a viscosity of 48,500 cp/25° C. It has been synthesized from 2,195 parts by weight (1.0 mol) of the same polyester as in adhesive coat solution H 1, 155.18 parts by weight (2.5 mol) of ethylene glycol, 30.54 parts by weight (0.5 mol) of ethanolamine and the equivalent quantity (1000 parts by weight) of 4,4'-diphenylmethane diisocyanate. A polyurethane film prepared from this solution is found to have the following physical properties:

| | |
|---|---|
| Tensile strength | 51.2 MPa |
| Elongation at break | 660% |
| 100% modulus | 3.8 MPa |
| Micro hardness | 74 |
| Melting range | 190°–200° C. (Kofler bench) |
| Pressure deformation after 2'/160° C. | 10% |
| Permanent pressure deformation | 0% |

Polyurethane solution (H 3) shows no tendency to become pasty and can easily be processed after several weeks of storage; the polyurethane shows good resistance to ironing (no permanent pressure deformation).

EXAMPLE 1d

Adhesive coat solution H 4 is a 35% solution of a polyester urethane in DMF/MEK (1:1) having a viscosity of 64,000 cP/25° C. It was synthesized from 2,195 parts by weight (1.0 mol) of the same polyester as that used for adhesive coat solution H 1, 93.10 parts by weight (1.5 mol) of ethylene glycol, 91.62 parts by weight (1.5 mol) of ethanolamine and the equivalent quantity (1000 parts by weight) of 4,4'-diphenylmethane diisocyanate. A polyurethane film prepared from this solution is found to have the following physical properties:

| | |
|---|---|
| Tensile strength | 51.9 MPa |
| Elongation at break | 500% |
| 100% modulus | 3.9 MPa |
| Micro hardness | 85 |
| Melting range | 188°–198° C. |

| | (Kofler bench) |
|---|---|
| Pressure deformation after 2'/160° C. | 0% |
| Permanent pressure deformation | 0% |

The polyurethane coat obtained from adhesive solution H 4 has excellent resistance to ironing (no pressure deformation at 160° C.). In spite of the slight cloudiness occurring after several weeks in storage, the solution (H 4) is still perfectly suitable for processing after 3 months.

EXAMPLE 1e

Adhesive coat solution H 5 is a 35% solution of a polyester urethane in DMF/MEK (1:1) having a viscosity of 66,000 cP/25° C. The polyurethane is composed of 2,195 parts by weight (1.0 mol) of the same polyester as that used for adhesive coat solution H 1, 31.04 parts by weight (0.5 mol) of ethylene glycol, 152.70 parts by weight (2.5 mol) of ethanolamine and the equivalent quantity (1000 parts by weight) of 4,4'-diphenylmethane diisocyanate. A polyurethane film formed from this solution is found to have the following physical properties:

| | |
|---|---|
| Tensile strength | 52.2 MPa |
| Elongation at break | 590% |
| 100% modulus | 6.4 MPa |
| Micro hardness | 85 |
| Melting range | 192°–200° C. (Kofler bench) |
| Pressure deformation after 2'/160° C. | 0% |
| Permanent pressure deformation | 0% |

Adhesive coat solution H 5 also gives rise to a polyurethane coat which has excellent resistance to ironing but it shows slight cloudiness after a short time in storage and distinct signs of becoming pasty after about 3 months.

EXAMPLE 1f

Adhesive coat solution H 6 is a 35% solution of a polyester urethane in DMF/MEK (1:1) having a viscosity of 69.600 cP/25° C. The solution was in this case synthesized from 2,195 parts by weight (1.0 mol) of the same polyester as that used for adhesive coat solution H 1, 155.18 parts by weight (2.5 mol) of ethylene glycol, 37.56 parts by weight (0.5 mol) of 1-amino-3-propanol and 1000 parts by weight of 4,4'-diphenylmethane diisocyanate. A film obtained from this solution is found to have the following physical properties:

| | |
|---|---|
| Tensile strength | 51.7 MPa |
| Elongation at break | 620% |
| 100% modulus | 3.5 MPa |
| Micro hardness | 80 |
| Melting range | 190°–200° C. (Kofler bench) |
| Pressure deformation after 2'/160° C. | 14% |
| Permanent pressure deformation | 0% |

Polyurethane solution (H 6) shows no tendency to become pasty. It can be processed after prolonged storage, giving rise to a polyurethane film which has high resistance to ironing (no permanent pressure deformation).

EXAMPLE 2a

A high melting polyester urethane (D 1) for producing top coats is composed of 2,195 parts by weight (1.0 mol) of a polyester of butane-1,4-diol and adipic acid having a hydroxyl number of 50.6 and an acid number of 0.5 297.94 parts by weight (4.8 mol) of ethylene glycol and the equivalent quantity (1450 parts by weight) of 4,4'-diphenylmethane diisocyanate.

The solid polyurethane (D 1) prepared in known manner is distinguished by its highly reduced solubility. When attempts are made to dissolve it in a solvent mixture of DMF/MEK (4:1) either in laboratory flasks equipped with stirrers or in the usual industrial dissolvers (e.g. "Spangenberg"), only highly viscous, gel-like solutions can be obtained, which cannot be processed on coating machines. It is only when special high-power mixers operating with very high shear forces (e.g. "Papenmeier") are used that a spreadable solution can be obtained. This solution has a solids content of 25% in DMF/MEK (4:1) and a viscosity of 8400 cP/25° C.

After only several days in storage, the solution shows a strong blocking effect which causes difficulties in coating installations operating at high speed. A film prepared from the fresh solution is found to have the following physical properties:

| Tensile strength | 55.0 MPa |
|---|---|
| Elongation at break | 480% |
| 100% modulus | 9.3 MPa |
| Micro hardness | 89 |
| Melting range | 202°-206° C. |
|  | (Kofler bench) |
| Pressure deformation after 2'/170° C. | 0% |
| Permanent pressure deformation | 0% |

EXAMPLE 2b

A top coat polyester urethane (D 2) was obtained from 2,195 parts by weight (1.0 mol) of the same polyester as that used for top coat (D 1), 279.32 parts by weight (4.5 mol) of ethylene glycol, 27.04 parts by weight (0.3 mol) of butane diol-(1,4) and 1450 parts by weight of 4,4'-diphenylmethane diisocyanate. The polyurethane solid has normal solution properties and dissolves in DMF/MEK (4:1) to form a 25% solution which has a viscosity of 10,000 cP/25° C. and is stable in storage.

A film obtained from this solution is found to have the following physical properties:

| Tensile strength | 63.9 MPa |
|---|---|
| Elongation at break | 520% |
| 100% modulus | 8.9 MPa |
| Micro hardness | 82 |
| Melting range | 185°-190° C. |
|  | (Kofler bench) |
| Pressure deformation after 2'/160° C. | 10% |
| Permanent pressure deformation | 3% |

Compared with top coat (D 1), top coat (D 2) has a distinctly lower melting range and weaker resistance to ironing (slightly permanent pressure deformation).

EXAMPLE 2c

A top coat polyester urethane (D 3) was obtained by polyaddition of 2,195 parts by weight (1.0 mol) of the same polyester as that used for top coat (D 1), 270.32 parts by weight (4.5 mol) of ethylene glycol, 18.32 parts by weight (0.3 mol) of ethanolamine and 1450 parts by weight of 4,4'-diphenylmethane diisocyanate. The solid polyurethane has normal solution properties and dissolves in DMF/MEK (4:1) to form a 25% solution having a viscosity of 15,700 cP/25° C. which is stable in storage.

A film prepared from this solution has the following properties:

| Tensile strength | 66.8 MPa |
|---|---|
| Elongation at break | 550% |
| 100% modulus | 8.6 MPa |
| Micro hardness | 86 |
| Melting range | 196°-208° C. |
|  | (Kofler bench) |
| Pressure deformation after 2'/160° C. | 1% |
| Permanent pressure deformation | 0% |

This top coat (D 3) has practically the same melting range as top coat (D 1) and equally good resistance to ironing and is at the same time distinguished by the solubility of the solid and ease of processing.

EXAMPLE 3a

A conventional top coat solution D 4 consists of a polyester urethane in DMF/MEK (3:2) having a viscosity of 10,500 cP/25° C. in which the polyurethane has been synthesized from 1000 parts by weight (0.5 mol) of hexane diol-1,6-polycarbonate and a hydroxyl number of 56.0 and an acid number of 0.1, 1098 parts by weight (0.5 mol) of a polyester of butane diol-(1,4) and adipic acid having a hydroxyl number of 50.6 and an acid number of 0.5; 270.36 parts by weight (3.0 mol) of butane-1,4-diol as chain-lengthening agent and the equivalent quantity (1000 parts by weight) of 4,4'-diphenylmethane diisocyanate.

The polyurethane is found to have the following properties as film:

| Tensile strength | 59.4 MPa |
|---|---|
| Elongation at break | 480% |
| 100% modulus | 10.7 MPa |
| Micro hardness | 93 |
| Melting range | 171°-178° C. |
|  | (Kofler bench) |
| Pressure deformation after 2'/160° C. | 69% |
| Permanent pressure deformation | 52% |

When the top coat (D 4) is laminated to a textile substrate by means of a two-component polyurethane comprising an adhesive coat solution (H 7) which has a low DMF content, the so-called frosting effect well known to be undesirable in coating processes occurs because the top coat does not dissolve sufficiently. The adhesive coat solution (H 7) is a 30% solution of a polyester urethane in DMF/MEK (1:3) having a viscosity of 25000 cP/25° C. The polyester urethane was synthesized from 500 g of a polyester of ethylene glycol and adipic acid (molecular weight approximately 2000), 500 g of a polyester of diethylene glycol and adipic acid (molecular weight approximately 2000) and 87.0 g of a mixture of 2,4- and 2,6-tolylene diisocyanate isomers. Before the adhesive coat solution is applied, 5.0 g of a 75% solution in ethyl acetate of a polyisocyanate (10.5% NCO) which has been prepared from 1.0 mol of trimethylolpropane and 3.0 mol of 2,4-tolylene diisocyanate and 5.0 g of a catalyst consisting of a 10% solution in ethylene dichloride/ethyl acetate (1:1) of a reaction product of 1.0 of N-methylethanolamine and 2.0 mol of phenyl isocyanate are added per 100 g of solution.

EXAMPLE 3b

A top coat solution D 5 modified in accordance with German Offenlegungsschrift No. 2,402,799 consists of a 25% solution of a polyester urethane in DMF/MEK (3:2) having a viscosity of 9,800 cP/25° C. The polyurethane in this solution has been synthesized in the same way as that used for the top coat (D 4) but contains a mixture of 225.30 parts by weight (2.5 mol) of butane diol-(1,4) and 59.09 parts by weight (0.5 mol) of hexane diol-(1,6) as chain-lengthening agent. A film obtained from this solution is found to have the following properties:

| Tensile strength | 44.8 MPa |
|---|---|
| Elongation at break | 470% |
| 100% modulus | 9.9 MPa |
| Micro hardness | 92 |
| Melting range | 156°–168° C. (Kofler bench) |
| Pressure deformation after 2'/160° C. | 91% |
| Permanent pressure deformation | 62% |

No frosting effect occurs when the top coat (D 5) is applied by means of adhesive coat solution (H 7) but the top coat does suffer some loss in dimensional stability at elevated temperature (see pressure deformation test).

EXAMPLE 3c

Top coat solution D 6 is a 25% solution of a polyester urethane in DMF/MEK (3:2) having a viscosity of 11,500 cP/25° C. The polyester urethane has been synthesized in the same way as those used in top coat solutions (D 4) and (D 5) but with a chain-lengthening agent consisting of a mixture of 225.3 parts by weight (2.5 mol) of butane diol-(1,4) and 30.54 parts by weight (0.5 mol) of ethanolamine.

This polyurethane has the following properties as film:

| Tensile strength | 52.9 MPa |
|---|---|
| Elongation at break | 540% |
| 100% modulus | 9.2 MPa |
| Micro hardness | 90 |
| Melting range | 165°–175° C. (Kofler bench) |
| Pressure deformation after 2'/160° C. | 45% |
| Permanent pressure deformation | 19% |

The top coat (D 6) can be applied with the aid of adhesive coat solution (H 7) without a frosting effect being produced, and compared with the original top coat (D 4) it has a higher dimensional stability at elevated temperature.

EXAMPLE 4a

Adhesive coat solution H 8 is a 35% solution of a polyurethane (D 4) in DMF/MEK (1:1) having a viscosity of 63,500 cP/25° C. With this low concentration of DMF, the solution is not stable for very long and tends to gel. A film prepared from the fresh solution is of the same quality as that obtained in Example 3a.

EXAMPLE 4b

Adhesive coat solution H 9 is a 35% solution of polyurethane (D 5) in DMF/MEK (1:1) having a viscosity of 58,600 cP/25° C. The solution is stable in storage but the polyurethane film obtained from it has a lower dimensional stability at elevated temperature as in Example 3b.

EXAMPLE 4c

Adhesive coat solution H 10 is a 35% solution of polyurethane (D 6) in DMF/MEK (1:1) which has viscosity of 70,900 cP/25° C. and is stable in storage. The polyurethane film obtained from it resembles that of Example 3c in its improved dimensional stability at elevated temperature.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. In a method of coating textile sheets by the reversal process with polyurethanes which are stable in storage as solutions according to which the solution of a polyurethane which is substantially free from reactive end groups is applied as top coat to a separating substrate in a first stage of the process, the top coat is dried and in a second stage an adhesive coat solution is applied to the top coat and the textile sheet is laminated thereto, the solvent in the adhesive coat is evaporated off in a second drying operation and the coated textile is subsequently lifted from the separating substrate, the improvement comprising the use of a polyurethane in at least one of the top coat and adhesive coat which has been prepared by the reaction of
   (a) at least one dihydroxyl compound having a molecular weight of between about 500 and 5000,
   (b) at least one diisocyanate and
   (c) a mixture of about 95–35 mol% of at least one diol having a molecular weight of between about 62 and 450 and about 5–65 mol %
of at least one monoalkanolamine having a molecular weight of about 61 to 200, the molar ratio of components (a) to (c) being between about 1:1 and 1:6 thereby giving a coating with improved pressure deformation resistance under heat.

2. Process according to claim 1 characterized in that the polyurethanes used as top coat have been prepared using ethylene glycol and monoethanolamine as component C.

3. Process according to claim 1, characterized in that the polyurethanes used as top coat have been prepared using 1-amino-3-propanol and ethylene glycol as component C.

4. Process according to claim 1 characterized in that the polyurethanes used as top coat have been prepared using butane diol-(1,4) and monoethanolamine as component C.

5. Process according to claim 1, characterized in that the polyurethanes used as adhesive coat have been prepared using ethylene glycol and monoethanolamine as component C.

6. Process according to claim 1, characterized in that the polyurethanes used as adhesive coat have been prepared using ethylene glycol and 1-amino-3-propanol as component C.

7. Process according to claim 1, characterized in that the polyurethanes used as adhesive coat have been prepared using butane diol-(1,4) and monoethanolamine as component C.

8. Process according to claim 1, characterized in that the adhesive coat solution contains at the most 65% by weight, based on the total quantity of solvent, of highly polar solvents.

9. Process according to claim 8, characterized in that the adhesive coat solution contains at the most 50% by weight, based on the total quantity of solvent, of highly polar solvents.

10. In the process of claim 1 the further improvement wherein
    (a) Component C comprises about 5 to 35 mol % of monoethanolamine and 95 to 65 mol % of ethylene glycol,
    (b) the ratio of components A to C is between about 1:1.5 and 1:5, and
    (c) the NCO to OH ratio of the polyurethane is between about 0.95 and 1.05.

11. In the process of claim 10 the further improvement wherein
    (a) the diisocyanate is 4,4'-diphenylmethane-diisocyanate,
    (b) the dihydroxy compound is a polyester or a polyether with a molecular weight between about 800 and 2500, and
    (c) the polyurethane has an NCO to OH ratio of between about 0.97 and 1.01.

* * * * *